United States Patent [19]

Etter

[11] Patent Number: 5,431,364
[45] Date of Patent: Jul. 11, 1995

[54] GOLF UMBRELLA HOLDER

[76] Inventor: Gary L. Etter, 3648 Vago La., St. Louis, Mo. 63034

[21] Appl. No.: 202,775

[22] Filed: Feb. 28, 1994

[51] Int. Cl.⁶ .............................................. F16M 13/00
[52] U.S. Cl. .................................... 248/514; 248/534; 135/16
[58] Field of Search .................... 135/16, 19; 248/514, 248/534, 540, 535, 231.7, 291

[56] References Cited

U.S. PATENT DOCUMENTS

| | | | |
|---|---|---|---|
| 3,036,800 | 5/1962 | Hendon | 248/540 |
| 3,304,035 | 2/1967 | Davis | 248/514 X |
| 3,424,419 | 1/1969 | Siegel | 248/231.7 |
| 4,641,395 | 2/1987 | Banks | 248/514 X |
| 4,709,891 | 12/1987 | Barnett | 248/231.7 X |
| 4,788,996 | 12/1988 | Forshee | 135/16 |
| 5,277,211 | 1/1994 | Hendershot | 135/16 |

FOREIGN PATENT DOCUMENTS

2817933  8/1979  Germany ............................. 248/540

*Primary Examiner*—Lanna Mai

[57] ABSTRACT

An umbrella holding device with a hollow holder having an upper end, a lower end, and an aperture formed through the holder adjacent to its upper end. A clevis having an upper end and a lower end, the lower end having a first and a second leg with an aperture formed through the legs. The upper end of the clevis is connected to the lower end of the holder. A clevis support has a first end and a second end received between the legs of the clevis. An aperture is formed through the first end of the clevis support aligned with the aperture of the legs of the clevis. A U-shaped bracket has a closed upper end, an open lower end, a first side and a second side with the first side being integral with the second end of the clevis support and with an aperture formed through the second side of the bracket. A first screw is secured within the aperture of the holder functioning to secure an object within the holder. A second screw is secured within the aperture of the first leg of the clevis, the aperture of the clevis support, and the aperture of the second leg of the clevis pivotally connecting the clevis to the clevis support. A third screw is secured within the aperture of the bracket.

1 Claim, 2 Drawing Sheets

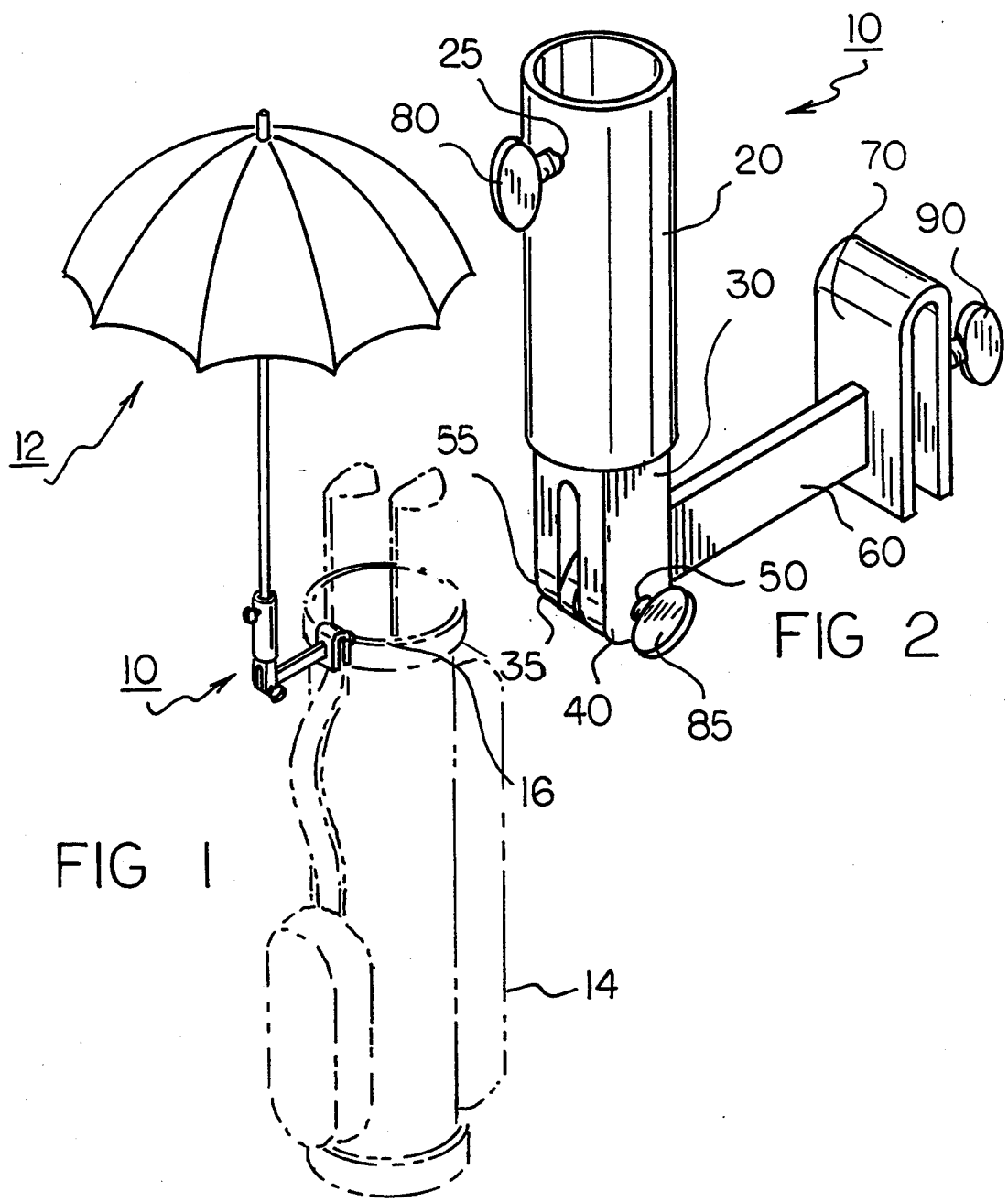

GOLF UMBRELLA HOLDER

BACKGROUND OF THE INVENTION

1. Field of the Invention

The present invention relates to golf umbrella holder and more particularly pertains to umbrella holder which can be attached to the rim of a golf bag.

2. Description of the Prior Art

The use of golf umbrella holders is known in the prior art. More specifically, golf umbrella holders heretofore devised and utilized for the purpose of attaching a golf umbrella to a golf cart are known to consist basically of familiar, expected, and obvious structural configurations, notwithstanding the myriad of designs encompassed by the crowded prior art which has been developed for the fulfillment of countless objectives and requirements.

For example U.S. Pat. No. 4,570,894 to Miele discloses an umbrella holder for a golf cart. The holder is adapted to hold a handle of an umbrella when the umbrella is open and to hold a collapsed canopy portion of the umbrella when the umbrella is closed.

U.S. Pat. No. 3,866,934 to Braun discloses a golf cart umbrella holder. The holder may be strapped to an upright frame in a golf cart or preferably, may be employed as the upright frame of a hand-pulled golf cart.

Des. 252,318 discloses an ornamental design for a golf cart carried open umbrella holder.

U.S. Pat. No. 4,974,807 to Moineau discloses a golf cart umbrella holder. The umbrella holder may be mounted on a mobile or stationary base.

Furthermore, U.S. Pat. No. 5,172,885 to Kreischer discloses an umbrella support. The assembly is for use in mounting an umbrella on any of a variety of wire baskets used on golf carts.

In this respect, the golf umbrella holder according to the present invention substantially departs from the conventional concepts and designs of the prior art, and in doing so provides an apparatus primarily developed for the purpose of attaching a golf umbrella to a golf bag.

Therefore, it can be appreciated that there exists a continuing need for new and improved golf umbrella holder which can be used to attach a golf umbrella to a golf bag. In this regard, the present invention substantially fulfills this need.

SUMMARY OF THE INVENTION

In view of the foregoing disadvantages inherent in the known types of golf umbrella holders now present in the prior art, the present invention provides an improved golf umbrella holder. As such, the general purpose of the present invention, which will be described subsequently in greater detail, is to provide a new and improved golf umbrella holder and method which has all the advantages of the prior art and none of the disadvantages.

To attain this, the present invention essentially comprises a golf umbrella holding device comprising a hollow cylindrical holder having an upper end, a lower end, an interior surface, and an exterior surface. An aperture is formed through the holder adjacent its upper end. A clevis has an upper end and a lower end, the lower end having a first and a second leg, the upper end being circular in cross section. A drainage aperture is formed through the upper end of the clevis. An aperture is formed through the first leg and an aperture is formed through the second leg. The upper end of the clevis is connected to the lower end of the cylindrical holder. A clevis support has a first end and a second end, the clevis support having a width which enables it to be received between the first and second legs of the clevis. An aperture is formed through the first end of the clevis support, the aperture through the first end of the clevis support is designed for alignment with the apertures of the first and second legs of the clevis. A U-shaped bracket has a closed upper end, an open lower end, a first side and a second side, the first side of the bracket being integral with the second end of the clevis support. An aperture is formed through the second side of the bracket, the open lower end of the bracket adapted to fit over the rim of a golf bag. A first thumb screw is adapted for securement within the aperture of the holder, the first thumb screw functioning to secure a cylindrical object within the cylindrical holder. A second thumb screw is adapted for securement within the aperture of the first leg of the clevis, the aperture of the clevis support, and the aperture of second leg of the clevis, the second thumb screw serving to pivotally connect the clevis to the clevis support. A third thumb screw is adapted for securement within the aperture of the bracket, the third thumb screw functioning to secure the bracket to the rim of a golf bag.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved golf umbrella holder which have all the advantages of the prior art golf umbrella holders and none of the disadvantages.

It is another object of the present invention to provide new and improved golf umbrella holder which may be easily and efficiently manufactured and marketed.

It is further object of the present invention to provide new and improved golf umbrella holder which are of durable and reliable constructions.

An even further object of the present invention is to provide new and improved golf umbrella holder which are susceptible of a low cost of manufacture with regard to both materials and labor, and which accordingly are then susceptible of low prices of sale to the consuming public, thereby making such golf umbrella holder economically available to the buying public.

Still yet another object of the present invention is to provide new and improved golf umbrella holder which provide in the apparatuses and methods of the prior art some of the advantages thereof, while simultaneously overcoming some of the disadvantages normally associated therewith.

Even still another object of the present invention is to provide a golf umbrella holder which may be clipped to the rim of a golf bag.

Lastly, it is an object of the present invention to provide new and improved umbrella holding device comprising a hollow holder having an upper end, a lower end, and an aperture is formed through the holder adjacent its upper end. A clevis has an upper end and a lower end, the lower end having a first and a second leg, an aperture is formed through the first leg and an aperture is formed through the second leg. The upper end of the clevis is connected to the lower end of the holder. A clevis support has a first end and a second end, the clevis support has a width which enables it to be received between the first and second legs of the clevis. An aperture is formed through the first end of the clevis support, the aperture through the first end of the clevis support designed for alignment with the apertures of the first and second legs of the clevis. A U-shaped bracket has a closed upper end, an open lower end, a first side and a second side, the first side of the bracket being integral with the second end of the clevis support. An aperture is formed through the second side of the bracket. A first screw is adapted for securement within the aperture of the holder, the first screw functioning to secure an object within the holder. A second screw is adapted for securement within the aperture of the first leg of the clevis, the aperture of the clevis support, and the aperture of second leg of the clevis. The second screw serves to pivotally connect the clevis to the clevis support. A third screw is adapted for securement within the aperture of the bracket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the golf umbrella holder constructed in accordance with the principles of the present invention.

FIG. 2 is a perspective view of the first embodiment of the present invention.

The same reference numerals refer to the same parts through the various Figures.

DESCRIPTION OF THE PREFERRED EMBODIMENT

Figure 3:
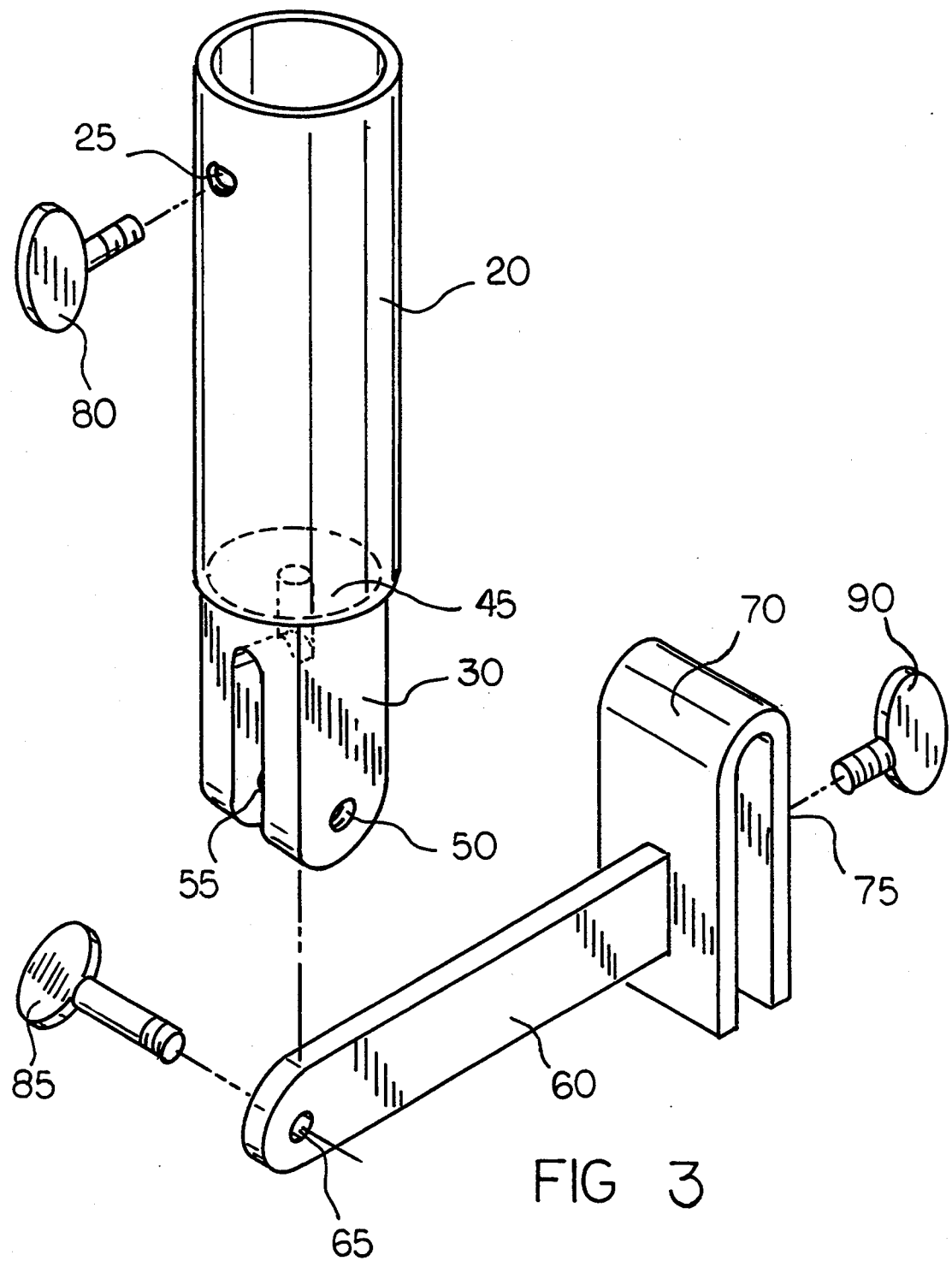
FIG. 3 is an exploded view of the first embodiment of the present invention.

With reference now to the drawings, and in particular to FIG. 1 thereof, the preferred embodiment of the new and improved golf umbrella holder embodying the principles and concepts of the present invention and generally designated by the reference numeral 10 will be described.

The present invention relates to a holding device 10 for a golf umbrella 12. The device 10 is intended for use in conjunction with a golf bag 14. In its broadest context, the device 10 includes a cylindrical holder 20, a clevis 30 pivotally connected to a clevis support 60, and a bracket 70. The bracket 70 permits the entire assembly to be secured to the rim of a golf bag 14.

The hollow cylindrical holder 20 includes an upper end, a lower end, an interior surface, and an exterior surface. The holder 20 is dimensioned to receive the shaft of a conventional golf umbrella 12. Furthermore, an aperture 25 is formed through the holder adjacent its upper end. The function of the aperture 25 will be described more fully hereafter.

The clevis 30 includes an upper end and a lower end. The lower end of the clevis incorporates a first leg 40 and a second leg 35. The upper end of the clevis 30 is circular in cross section and is connected to the lower end of the cylindrical holder 20. Apertures 50 and 55 are formed through the first and second legs of the clevis respectively. The apertures of the legs aid in pivotally connecting the clevis 30 to the clevis support 60.

In case of moisture build up within the cylindrical holder, a drainage aperture 45 is formed through the upper end of the clevis. The first end of the drainage aperture is in fluid communication with the interior of the cylindrical holder, and the outlet is between the legs of the clevis 30.

Pivotally connected to the clevis 30 is a clevis support 60. The clevis support 60 includes a first end and a second end. The clevis support 60 has a width which enables it to be received between the first and second legs of the clevis. An aperture 65 is formed through the first end of the clevis support. The aperture through the first end of the clevis support is designed for alignment with the apertures 50 and 55 of the first 40 and second legs 35 of the clevis 30. Together the apertures of the first and second legs, and the aperture of the clevis support provide a means to pivotally connect the clevis 30 to the clevis support 60.

The device 10 employs a U-shaped bracket 70 to enable it to be attached to the rim of a golf bag 14. The U-shaped bracket 70 includes a closed upper end, an open lower end, a first side and a second side. The first side of the bracket is integral with the second end of the clevis support. Furthermore, an aperture 75 is formed through the second side of the bracket. The function of this aperture will be described more fully hereafter. The open lower end of the bracket is adapted to fit over the rim of a golf bag 14.

The function of aperture 25 of the cylindrical holder will now be described. A first thumb screw 80 is adapted for securement within the aperture 25 of the holder. The first thumb screw 80 functions to secure a cylindrical object within the cylindrical holder. Thus, if the shaft of an umbrella is positioned within the holder, the thumb screw 80 can be employed to apply pressure to the shaft and secure it within the holder.

A second thumb screw 85 functions to pivotally connect the clevis 30 to the clevis support 60. The second thumb 85 screw is adapted for securement within the aperture 50 of the first leg of the clevis 30, the aperture 15 of the clevis support 65, and the aperture 55 of second leg of the clevis 30.

The function of the aperture 75 of the bracket will now be described. A third thumb screw 90 is adapted for securement within the aperture 75 of the bracket. The third thumb screw 90 functions to secure the bracket to the rim of a golf bag 14. Thus, when the bracket is positioned over the rim of the golf bag, the third thumb screw 90 can be employed to apply pressure to the rim and secure the bracket to the rim.

The golf umbrella holder of the present invention offers a quick and convenient way to secure a golf umbrella to virtually any desired surface. In addition, it offers great flexibility in adjusting the umbrella to the proper angle. When using this product, the golfer can keep his hands free while selecting a club from the bag. Also, the umbrella can be secured so that it doesn't blow away while the golfer is hitting or putting. Moreover, it can provide shelter from the elements for the golfer's equipment.

The present invention is disclosed as a device which consists of two main pieces connected by an adjustable tilt-lock mechanism. One piece is basically a hollow cylinder into which the handle of the umbrella is inserted. The handle can then be tightened in place with a thumbscrew on the outside of the cylinder. The other piece is a horizontal arm, rectangular in shape, that leads to a clamp. The clamp is also adjustable by means of a thumbscrew.

The present invention is used in the following way: First, the golf umbrella holder is clamped to the golfer's pull cart or other chosen object. The umbrella can then be inserted into the cylinder and adjusted to the appropriate angle be means of the tilt lock.

For those looking for an easy-to-use golf umbrella that offers great flexibility in attaching it and adjusting its angle, the present invention is a promising choice.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A golf umbrella holding device comprising, in combination:
   a hollow cylindrical holder having an upper end, a lower end, an interior surface and an exterior surface with an aperture formed through the holder adjacent its upper end;
   a clevis having an upper end and a lower end, the lower end having a first and a second leg spaced apart from each other, the upper end being circular in cross-section, a drainage aperture formed through the upper end of the clevis with an aperture formed through the first leg and an aperture formed through the second leg, the upper end of the clevis connected to the lower end of the cylindrical holder;
   a clevis support having a first end and a second end, the clevis support having a width less than the space between the first and second legs of the clevis, an aperture formed through the first end of the clevis support, the aperture through the first end of the clevis support positioned in alignment with the apertures of the first and second legs of the clevis;
   a U-shaped bracket having a closed upper end, an open lower end, a first side and a second side, the first side of the bracket being integral with the second end of the clevis support, an aperture formed through the second side of the bracket, the open lower end of the bracket adapted to fit over the rim of a golf bag;
   a first thumb screw secured within the aperture of the holder, the first thumb screw functioning to secure a cylindrical object within the cylindrical holder;
   a second thumb screw secured within the aperture of the first leg of the clevis, the aperture of the clevis support and the aperture of the second leg of the clevis with the second thumb screw serving to pivotally connect the clevis to the clevis support; and
   a third thumb screw secured within the aperture of the bracket, the third thumb screw functioning to secure the bracket to the rim of a golf bag.

* * * * *